(12) United States Patent
Melanson et al.

(10) Patent No.: US 10,950,245 B2
(45) Date of Patent: Mar. 16, 2021

(54) GENERATING PROMPTS FOR USER VOCALISATION FOR BIOMETRIC SPEAKER RECOGNITION

(71) Applicant: Cirrus Logic International Semiconductor Ltd., Edinburgh (GB)

(72) Inventors: John Laurence Melanson, Austin, TX (US); John Paul Lesso, Edinburgh (GB)

(73) Assignee: Cirrus Logic, Inc., Austin, TX (US)

(*) Notice: Subject to any disclaimer, the term of this patent is extended or adjusted under 35 U.S.C. 154(b) by 89 days.

(21) Appl. No.: 15/666,267

(22) Filed: Aug. 1, 2017

(65) Prior Publication Data

US 2018/0040325 A1 Feb. 8, 2018

Related U.S. Application Data

(60) Provisional application No. 62/370,393, filed on Aug. 3, 2016.

(30) Foreign Application Priority Data

Dec. 23, 2016 (GB) ..................................... 1622198

(51) Int. Cl.
*G10L 17/00* (2013.01)
*G10L 17/02* (2013.01)
(Continued)

(52) U.S. Cl.
CPC .............. *G10L 17/24* (2013.01); *G10L 17/00* (2013.01); *G10L 17/02* (2013.01); *G10L 17/06* (2013.01); *G06F 21/32* (2013.01); *G10L 17/04* (2013.01)

(58) Field of Classification Search
CPC ......... G10L 17/24; G10L 17/06; G10L 17/00; G10L 17/02; G10L 15/07; G10L 17/04
See application file for complete search history.

(56) References Cited

U.S. PATENT DOCUMENTS 4,591,668 A * 5/1986 Iwata ....................... H04R 1/46
381/151
4,829,572 A 5/1989 Kong
(Continued)

FOREIGN PATENT DOCUMENTS

| EP | 3154055 A2 | 4/2017 | |
|---|---|---|---|
| WO | WO-0116940 A1 * | 3/2001 | ............. G10L 17/00 |
| WO | 2015012680 A2 | 1/2015 | |

OTHER PUBLICATIONS

International Search Report and Written Opinion of the International Searching Authority, International Application No. PCT/GB017/052233, dated Dec. 7, 2017.
(Continued)

*Primary Examiner* — Daniel C Washburn
*Assistant Examiner* — Oluwadamilola M Ogunbiyi
(74) *Attorney, Agent, or Firm* — Jackson Walker L.L.P.

(57) ABSTRACT

This application describes methods and apparatus for generating a prompt to be presented to a user for the user to vocalise as part of speaker recognition. An apparatus according to an embodiment has a selector for selecting at least one vocal prompt element to form at least part of said prompt from a predetermined set of a plurality of vocal prompt elements. The selector is configured to select the vocal prompt element based, at least partly, on an indication of the operating conditions for the biometric speaker recognition, for example background noise. The prompt is selected to be one which will provide a good likelihood of discrimination between users when vocalised and used for speaker recognition in the current operating conditions. The prompt may be issued as part of a verification process for an existing user or an enrolment process for an enrolling user.

19 Claims, 4 Drawing Sheets

(51) Int. Cl.
  *G10L 17/04* (2013.01)
  *G10L 17/06* (2013.01)
  *G10L 17/24* (2013.01)
  *G10L 21/02* (2013.01)
  *G06F 21/32* (2013.01)

(56) References Cited

U.S. PATENT DOCUMENTS

| | | | |
|---|---|---|---|
| 4,937,871 A | 6/1990 | Hattori | |
| 5,522,012 A | 5/1996 | Mammone et al. | |
| 5,737,485 A * | 4/1998 | Flanagan | G10L 15/16 |
| | | | 704/232 |
| 5,933,807 A | 8/1999 | Fukuzawa | |
| 5,946,654 A | 8/1999 | Newman et al. | |
| 5,963,903 A * | 10/1999 | Hon | G10L 15/063 |
| | | | 704/240 |
| 6,253,179 B1 | 6/2001 | Beigi et al. | |
| 6,256,609 B1 | 7/2001 | Byrnes et al. | |
| 6,804,350 B1 | 10/2004 | Siqueira | |
| 6,983,252 B2 * | 1/2006 | Matheson | G06F 9/451 |
| | | | 704/275 |
| 8,005,675 B2 | 8/2011 | Wasserblat | G10L 25/69 |
| | | | 704/252 |
| 8,024,196 B1 * | 9/2011 | Wodtke | H04M 3/4938 |
| | | | 379/90.01 |
| 8,190,437 B2 * | 5/2012 | Farrell | G10L 17/04 |
| | | | 704/273 |
| 8,812,319 B2 * | 8/2014 | Skerpac | G10L 17/005 |
| | | | 704/246 |
| 9,502,039 B2 * | 11/2016 | Foerster | G10L 17/22 |
| 2002/0095295 A1 | 7/2002 | Cohen et al. | |
| 2004/0107098 A1 | 6/2004 | Deligne et al. | |
| 2004/0236573 A1 | 11/2004 | Sapeluk | |
| 2005/0027527 A1 * | 2/2005 | Junkawitsch | G10L 15/20 |
| | | | 704/243 |
| 2005/0060153 A1 | 3/2005 | Gable et al. | |
| 2005/0096906 A1 * | 5/2005 | Barzilay | G06Q 30/06 |
| | | | 704/249 |
| 2005/0021335 A1 | 7/2005 | Chaudhari et al. | |
| 2006/0053009 A1 * | 3/2006 | Jeong | G10L 15/30 |
| | | | 704/234 |
| 2006/0116877 A1 | 6/2006 | Pickering et al. | |
| 2006/0229875 A1 * | 10/2006 | Acero | G10L 15/07 |
| | | | 704/261 |
| 2008/0300871 A1 * | 12/2008 | Gilbert | G10L 15/20 |
| | | | 704/233 |
| 2009/0063146 A1 | 3/2009 | Yoshioka | |
| 2009/0122198 A1 | 5/2009 | Thorn | |
| 2009/0281809 A1 * | 11/2009 | Reuss | G10L 17/24 |
| | | | 704/273 |
| 2010/0082341 A1 | 4/2010 | Kim | |
| 2010/0223056 A1 | 9/2010 | Kadirkamanathan | |
| 2011/0102142 A1 * | 5/2011 | Widger | G09B 5/06 |
| | | | 340/5.83 |
| 2011/0202345 A1 * | 8/2011 | Meyer | G10L 13/033 |
| | | | 704/260 |
| 2012/0281885 A1 | 11/2012 | Syrdal et al. | |
| 2013/0132091 A1 * | 5/2013 | Skerpac | G06F 21/32 |
| | | | 704/273 |
| 2013/0185066 A1 * | 7/2013 | Tzirkel-Hancock | G10L 21/057 |
| | | | 704/233 |
| 2014/0064514 A1 * | 3/2014 | Mikami | G10L 21/0208 |
| | | | 381/86 |
| 2014/0278391 A1 * | 9/2014 | Braho | G10L 25/78 |
| | | | 704/233 |
| 2014/0324428 A1 * | 10/2014 | Farraro | G10L 15/22 |
| | | | 704/244 |
| 2015/0056951 A1 * | 2/2015 | Talwar | H04W 12/06 |
| | | | 455/411 |
| 2015/0081301 A1 | 3/2015 | Nicholson et al. | |
| 2015/0347734 A1 * | 12/2015 | Beigi | G06F 21/32 |
| | | | 713/155 |
| 2015/0371639 A1 | 12/2015 | Foerster et al. | |
| 2016/0189707 A1 | 6/2016 | Donjon et al. | |
| 2016/0203821 A1 * | 7/2016 | Zeljkovic | G10L 17/24 |
| 2016/0225374 A1 * | 8/2016 | Rodriguez | G10L 17/10 |
| 2016/0275952 A1 * | 9/2016 | Kashtan | G10L 17/22 |
| 2016/0284345 A1 | 9/2016 | Ji | |
| 2016/0307574 A1 * | 10/2016 | Roblek | G10L 17/24 |
| 2017/0017782 A1 * | 1/2017 | Roos | G06F 21/31 |
| 2018/0107449 A1 * | 4/2018 | Krampf | H03J 1/0025 |
| 2019/0385615 A1 * | 12/2019 | Sharifi | G10L 17/00 |

OTHER PUBLICATIONS

Zhao, Yali et al., "Dual-microphone based binary mask estimation for robust speaker verification", 2012 International Conference on Audio, Language and Image Processing (ICALIP), Jul. 16, 2012, pp. 1014-1019.

Leung, K.Y. et al., Adaptive articulatory feature-based conditional pronunciation modeling for speaker verification, Speech Communication, Elsevier Science Publishers, Amsterdam, NL, vol. 48, No. 1, Jan. 1, 2006, pp. 71-84.

Besacier, L. et al., "Frame pruning for automatic speaker identification", 9th European Signal Processing Conference (EUSIPCO 1998), IEEE, Sep. 8, 1998, pp. 1-4.

International Search Report and Written Opinion of the International Searching Authority, International Application No. 052234, dated Dec. 8, 2017.

Combined Search and Examination Report under Sections 17 and 18(3), UKIPO, Application No. GB1622198.8, dated Jun. 6, 2017.

Combined Search and Examination Report under Sections 17 and 18(3), UKIPO, Application No. GB1622191.3, dated Jun. 26, 2017.

* cited by examiner

GENERATING PROMPTS FOR USER VOCALISATION FOR BIOMETRIC SPEAKER RECOGNITION

FIELD

The field of representative embodiments of this disclosure relates to methods, apparatuses, or implementations concerning or relating to biometric speaker recognition. Applications include, but are not limited to, those concerning speaker enrolment or verification, especially in the presence of environmental effects such as background noise.

BACKGROUND

Voice user interfaces are provided to allow a user to interact with a system using their voice. One advantage of this interface, for example in devices such as smartphones, tablet computers and the like, is that it allows the user to operate at least some aspects of the device in a hands-free manner. Speech recognition techniques, i.e. techniques to extract the words spoken from the voice audio signal, may, for example, be used to detect that a particular trigger phrase has been spoken to set the device to expect a spoken command and to recognize a command when spoken and to perform operations in response. For example, if the spoken command asks for publicly available information, then the interface may cause a query to be submitted to an internet search engine in order to be able to supply that information to the user.

In some cases, some level of authentication may be desirable to verify the identity of the user before acting on a command, whether spoken or not, for example if the command relates to personal information, or requests some financial transaction.

To maintain a generally hands-free mode of user interaction, the voice user interface may comprise some form of speaker recognition, i.e. some analysis of the voice audio input signal to extract characteristics of that signal distinctive to one of one or more users. Also, speaker recognition may allow the identity of the user to be verified with a high level of confidence with more security than passwords and more conveniently than other biometric verification methods, such as fingerprint or iris patterns and used to allow operations, such as financial transactions.

In one typical system, a user interface may provide a prompt to the user, for instance a visual prompt indicating a word or phrase that the user must speak. The resulting speech sample audio signal is then analyzed for similarity with stored previous speech samples from an authorized user entered in a previous enrolment session, and if the speech sample is sufficiently similar, the user is authenticated and operations allowed, possibly including financial transactions or access to personal data.

The accuracy of this user verification may be characterized in terms of a false acceptance rate (FAR) and a false rejection rate (FRR). The FAR quantifies the probability that a different user may be falsely authenticated as an authorized user, with obvious financial security and privacy risks to the proper user. The FRR quantifies the probability that a valid user may be rejected, which causes inconvenience to the user, who may then have to repeat his attempt or use some other form of authentication.

The speaker recognition process may rely on comparing spectral characteristics of the current speech samples with those of previously enrolled speech samples. However, any background noise during authentication attempts may be superimposed on the speaker's voice and may hide or alter spectral features and thus give errors in the comparison. Background noise during enrolment may conversely add features that are absent when authenticating in a quiet environment. These effects may degrade the FAR or FRR, with the undesirable security or user inconvenience consequences described above.

Other than repeat attempts at speech input, or resorting to alternative authentication means, alternative means for mitigating the problem include signal processing to try and remove the noise. However, attempts to remove the noise added to the signal may affect the spectral characteristics of the resultant compensated speech and thus again degrade the accuracy.

According to an embodiment there is provided an apparatus for generating a prompt to be vocalised by a user for biometric speaker recognition comprising:
  a selector for selecting at least one vocal prompt element to form at least part of said prompt from a predetermined set of a plurality of vocal prompt elements;
  wherein the selector is configured to select the vocal prompt element based, at least partly, on an indication of the operating conditions for the biometric speaker recognition.

The selector may be configured to select the vocal prompt element based on respective discrimination scores for the vocal prompt elements wherein at least some discrimination scores vary according to the indication of operating conditions for the biometric speaker recognition.

The set of plurality of vocal prompt elements may comprise a plurality of predefined subsets of vocal prompt elements and the selector may be configured to select the voice prompt from one of the subsets based on the indication of operating conditions. At least some of the plurality of subsets of voice prompt elements may be mutually exclusive.

The voice prompt elements may be associated with metadata indicating speech sounds associated with the voice prompt when vocalised. The selector may be configured to select the voice prompt based on the metadata and the indication of operating conditions.

The indication of the operating conditions may comprise an indication of the acoustic environment in which the voice prompt will be vocalised.

The selector may be configured to select the vocal prompt element based on an indication of noise in an audio signal derived from a microphone to be used to receive the vocalised prompt. The indication of noise may comprise an indication of at least one of: noise amplitude level; noise frequency and/or spectrum; noise level relative to signal level for sounds vocalised by the user. The apparatus may comprise a noise estimator for receiving the audio signal derived from the microphone to be used to receive the vocalised prompt and determining the indication of noise. The noise estimator may be configured to identify and analyse parts of the audio signal that do not correspond to sounds vocalised by the user to determine the indication of noise.

The selector may be configured such that if the indication of noise is above a first threshold level, then no vocal prompt element is selected.

In some embodiments the indication of operating conditions may comprise an indication of reverberation in an audio signal derived from a microphone to be used to receive the vocalised prompt. In some embodiments the indication of operating conditions may comprise an indication of pitch of sounds previously vocalised by the user. In some embodiments the indication of operating conditions may comprise an indication of a parameter of the acoustic channel to be used to receive the vocalised prompt. For instance the selector may be configured to select the vocal prompt element based on an indication of microphone resonances. In some embodiments the indication of operating conditions may comprise an indication of a parameter of an audio processing chain between a microphone to be used to receive the vocalised prompt and a speaker recognition apparatus. For instance the selector may be configured to select the vocal prompt element based at least in part on an indication of bandwidth of the audio chain. In some embodiments the indication of operating conditions may comprise an indication of vocal characteristics of a user whose identity is to be verified. In some embodiments the indication of operating conditions may comprise an indication of previous prompts generated as part of a current attempt to verify the identity of a user.

The apparatus may include a speaker recognition module configured to analyse an audio signal corresponding to sounds vocalized by a user for speaker recognition. The speaker recognition module may be operable in a verification mode to compare said audio signal with at least one user model for an enrolled user. In which case the speaker recognition module may be configured to receive an indication of the selected prompt element and to select at least one user model for an enrolled user based on the selected vocal prompt element. Additionally or alternatively the speaker recognition module may be operable in an enrolment mode to process said audio signal to form a user model for an enrolling user. In which case the speaker recognition module may be configured to receive an indication of the selected prompt element and to form said user model for the enrolling user based on the selected vocal prompt element.

The apparatus may further comprise a speech recognition module configured to analyse an audio signal corresponding to sound vocalized by the user in response to the prompt to determine whether or not the user did vocalise the selected at least one vocal prompt element.

The apparatus may have a user interface for presenting the selected at least vocal prompt element to the user. The user interface may comprise at least one of a visual display for displaying a graphical or textual indication of the selected vocal prompt elements and a loudspeaker for playing to the user a sound comprising the vocal prompt elements.

The apparatus may have a microphone for generating an audio signal corresponding to sounds vocalised by the user.

In some embodiments the apparatus may be implemented as an integrated circuit.

Embodiments also relate to electronic devices comprising an apparatus as described in any of the variants outline above. The electronic device may be at least one of: a portable device; a communication device; a mobile telephone; a computing device; a laptop, notebook or tablet computer; a gaming device; a wearable device; a voice controllable device; an identity verification device; a wearable device; or a domestic appliance.

Embodiments also relate to an apparatus for generating a prompt to be vocalised by a user for biometric speaker recognition comprising:
 a selector for selecting at least one vocal prompt element to form at least part of said prompt from a predetermined set of a plurality of vocal prompt elements;
 wherein the selector is configured to select the vocal prompt element based on an indication of noise in an audio channel used for the biometric speaker recognition.

Embodiments also relate to an apparatus for generating a prompt to be vocalised by a user for biometric speaker recognition comprising:
 a selector for selecting at least one vocal prompt element to form at least part of said prompt from a predetermined set of a plurality of vocal prompt elements;
 wherein the selector is configured to select the vocal prompt element based on the operating conditions of the biometric speaker recognition and a discrimination score for the vocal prompt element indicative of the likelihood of that vocal prompt element to provide discrimination between users for the current operating conditions.

Embodiments also relate to an apparatus for generating a prompt to be vocalised by a user for biometric speaker recognition comprising:
 a selector for selecting at least one vocal prompt element to form at least part of said prompt from a predetermined set of a plurality of vocal prompt elements;
 wherein the selector is configured to select the vocal prompt element based on the operating conditions of the biometric speaker recognition so as to avoid vocal prompt elements that would not provide discrimination between users for the current operating conditions.

Embodiments also relate to an apparatus for generating a prompt to be vocalised by a user for biometric speaker recognition comprising:
 a selector for selecting at least one vocal prompt element to form at least part of said prompt from a predetermined set of a plurality of vocal prompt elements;
 wherein each of said set of vocal prompt elements provides discrimination between different users above a predetermined threshold level.

Each of the set of vocal prompts may have an associated discrimination score above the predetermined threshold level, the discrimination score for the vocal prompt element being indicative of the likelihood of that vocal prompt element to provide discrimination between users. The discrimination score may be based, at least partly, on historic data regarding the ability of the vocal prompt element to discriminate between users determined by speaker recognition characterisation over a population of speakers. The discrimination score may additionally or alternatively be based, at least partly, on an analysis of phonemes forming the vocal prompt element and a model of phoneme combinations and discrimination scores. Additionally or alternatively the discrimination score may be based, at least partly, on an analysis of the known or expected characteristics of an audio signal corresponding to a vocalisation of the vocal prompt element and a model of audio characteristics and discrimination scores. The characteristics of an audio signal may comprise characteristics of a formant known or expected in the audio signal corresponding to a vocalisation of the vocal prompt element.

Embodiments also relate to an apparatus for generating a prompt to be vocalised by a user for biometric speaker recognition comprising:
 a selector for selecting at least one vocal prompt element to form at least part of said prompt from a stored set of a plurality of vocal prompt elements;
 wherein each vocal prompt element of said set comprises at least one feature that provides discrimination between different users above a threshold level.

Embodiments also relate to an apparatus for generating a prompt to be vocalised by a user for biometric speaker recognition comprising:

a selector for selecting at least one vocal prompt element to form at least part of said prompt from a stored set of a plurality of vocal prompt elements;

wherein each vocal prompt element of said set strongly excites a resonance of a user's vocal tract when vocalised.

Embodiments also relate to a method of generating a prompt to be vocalised by a user for biometric speaker recognition comprising:

selecting at least one vocal prompt element to form at least part of said prompt from a predetermined set of a plurality of vocal prompt elements;

wherein the selection of the at least one vocal prompt element is based, at least partly, on an indication of the operating conditions for the biometric speaker recognition.

Selecting the at least one vocal prompt element may comprise determining a discrimination score for at least some of the vocal prompt elements of the predetermined set based on the operating conditions and selecting the at least one vocal prompt element based on the discrimination scores. The method may involve identifying a first subset of vocal prompt elements having the best discrimination scores for the operating conditions and choosing at least one of the vocal prompt elements of the first subset. The at least one vocal prompt element may be randomly chosen from the first subset.

Embodiments also relate to a method of speaker recognition comprising:

generating a prompt to be vocalised by a user;

wherein at least part of said prompt is selected on the basis of at least one predetermined indicator so as to provide a good likelihood of discrimination between users.

The predetermined indicator may comprise a discrimination score for a vocal prompt element indicative of the ability of the vocal prompt element to provide discrimination between users. The predetermined indicator may comprise membership of a vocal prompt element of a set of vocal prompt elements determined to provide a good likelihood of discrimination between users. The prompt or part of the prompt may also be selected based on an indication of operating conditions.

BRIEF DESCRIPTION OF THE FIGURES

To better explain the principles and advantages of various embodiments, examples will now be described with respect to the accompanying drawings, of which.

EXAMPLE EMBODIMENTS OF THE PRESENT DISCLOSURE

Figure 1A:
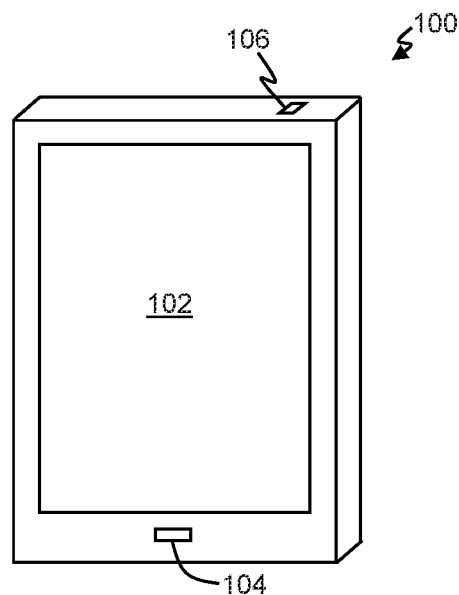
FIGS. 1a and 1b illustrate an electronic device capable of speaker recognition.

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Embodiments relate to methods and apparatus for use in biometric speaker recognition, i.e. speaker recognition based on analysis of audio signals corresponding to speech sounds, i.e. utterances, of a user.

For clarity, as used in this description, the term "speaker recognition" at least refers to providing information about the identity of a person speaking. For example, speaker recognition may determine the identity of a speaker, from among a group of previously registered individuals. For instance, if Alice and Barbara are both registered users, the speaker recognition may determine whether the current user speaking is Alice or is Barbara. Speaker recognition may also determine the current speaker is most likely not a member of the group of previously registered individuals, for instance maybe a malfeasor or maybe just an innocent bystander whose voice has been captured unintentionally. In some implementations, speaker recognition may provide information indicating whether a speaker is or is not a particular individual, for example for the purposes of identification and/or authentication, e.g. if Alice is a registered voice user of the device the speaker recognition may confirm or verify whether or not the current user is indeed Alice. In such speaker recognition implementations, it is usual for one or more users to provide voice samples as part of an enrollment process which can be processed so as to derive characteristics about the user which can be used later as part of identification and/or verification. The term speaker recognition processing at least refers to processing audio data for speaker recognition purposes which shall include identification and/or verification as well as any enrollment or registration.

As used in this description, the term speaker recognition is distinct from the term "speech recognition". Speech recognition, as used herein, at least refers to determining the content and/or the meaning of what is spoken, rather than recognizing the person speaking. It will be understood that it would be possible to implement speech recognition without speaker recognition, for example if the identity of a user was not important or was to be established when required in some other way. There may be some implementations where speaker recognition is required, e.g. for biometric verification of identity, but speech recognition is not required. In at least some implementations, however, a system may be selectively operable to provide both speaker recognition and speech recognition, either simultaneously or individually as required.

Figure 1B:
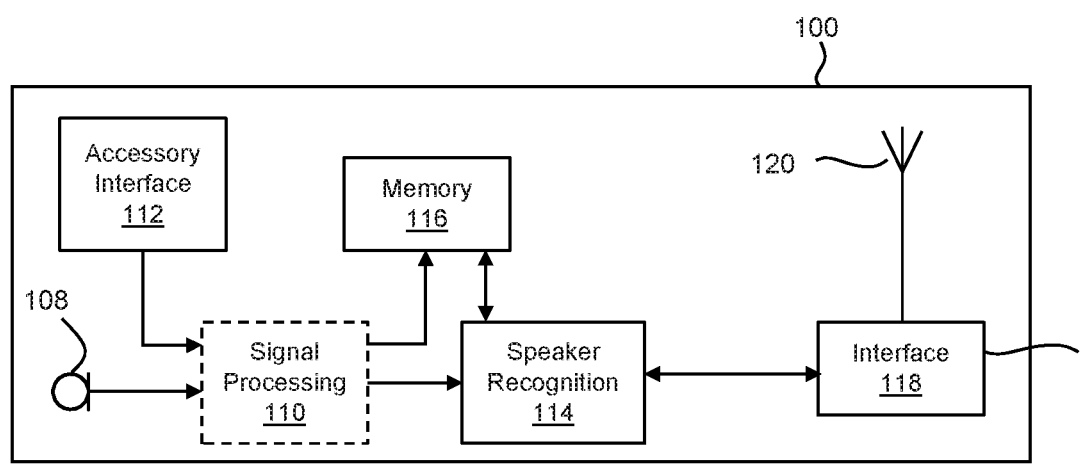

FIGS. 1a and 1b show a device 100 in accordance with one aspect of the invention. FIG. 1a illustrates a perspective view of the device, and FIG. 1b illustrates some of the typical functional modules within such a device, which, in this example, is a portable device, such as a mobile telephone or tablet computer or the like. It will be appreciated, however, that the device may be any type of device where speaker recognition may be of use. Such devices may include, without limitation, devices such as a tablet computer, a game console, a remote control device, a domestic appliance (which shall be taken to include domestic control systems, such as a domestic temperature or lighting control system), a toy, a machine such as a robot, or the like. It will also be appreciated that the device 100, especially when implemented as a smartphone or tablet computer or the like, may, by suitable software, be used as the control interface for controlling any other further device or system.

The device 100, in this example, includes a screen 102 for displaying information to a user, a sound inlet 104, for allowing sound to be detected by a microphone, and a connector 106, such as a jack socket or other port or receptacle, for allowing an accessory, to be connected to the device.

In this example, the device 100 includes a microphone 108, which may for example be located close to the sound inlet 104 shown in FIG. 1a. Electronic signals generated by the microphone 108 are passed to a signal processing block 110, which performs initial signal processing of the signals, for example converting analog signals received from the microphone 108 into digital signals.

The device 100, in this example, also includes an accessory interface 112 which may, for example, be located close to the jack socket 106 shown in FIG. 1a. The jack socket 106 and the interface 112 may be suitable for allowing an audio accessory, such as a headset to be connected thereto, and signals received from a microphone on such an accessory may also be passed to the signal processing block 110, which may perform initial signal processing of the signals.

The signal processing block 110 is connected to a speaker recognition module 114. The term "module" shall be used to at least refer to a functional unit, and the functional unit may be implemented at least partly by dedicated hardware components such as custom defined circuitry and/or at least partly be implemented by one or more software processors or appropriate code running on a suitable processor, which may be a general purpose processor or the like. Any circuitry components or software processes forming part of one module may be shared with another module, and/or the same processor may implement multiple modules. A particular module may itself comprise component modules.

The speaker recognition module 114 may be configured to implement one or more of the methods of the present disclosure, as described herein. The speaker recognition module 114 may be implemented by a suitable processor and may operate on the basis of data and program instructions stored in a memory 116. It will be appreciated that a processor used to implement the speaker recognition module 114 may be a general purpose processor that is provided for a range of tasks and which may be used for a variety of functions, for instance an applications processor of the device 100. In some implementations, however, the speaker recognition module 114 may comprise a processor which is specifically provided for the purposes of speaker recognition, and/or the speaker recognition module 114 may include at least some custom or dedicated circuitry.

The speaker recognition module 114, in this example, is connected to an interface 118, which is itself connected to an antenna 120, allowing signals to be transmitted and received over an external network to remote devices.

For speaker recognition, the on-board microphone 108 of the device 100 or a microphone of a connected accessory may therefore generate an audio signal corresponding to the utterances of the present user of the device. Such a microphone signal may be subject to some initial processing by signal processing block 110, e.g. converted to a suitable digital audio signal. Alternatively, the audio signal corresponding to the utterances of the user may be received via some other channel, for instance via antenna 120, say from a microphone which is part of an accessory that communicates with device 100 via some wireless protocol, such as Bluetooth™, or the like. In some embodiments, the audio signals corresponding to utterances of the user may be generated remotely by suitable audio detecting apparatus and transmitted to device 100 via any suitable communication channel, whether wired or wireless.

In some implementations, the device 100 may receive the audio signals corresponding to utterances of the user in a suitable form, without needing to perform any prior signal detection or signal processing. In such implementations, the device may not require signal processing block 110. In some implementations, the device 100 may be configured to receive audio signals via a subset of microphone 108, accessory interface 112, or wireless interface 118 or even via some other input route, in which case the redundant elements may be omitted, or at least not coupled to speaker recognition module 114.

Figure 2:
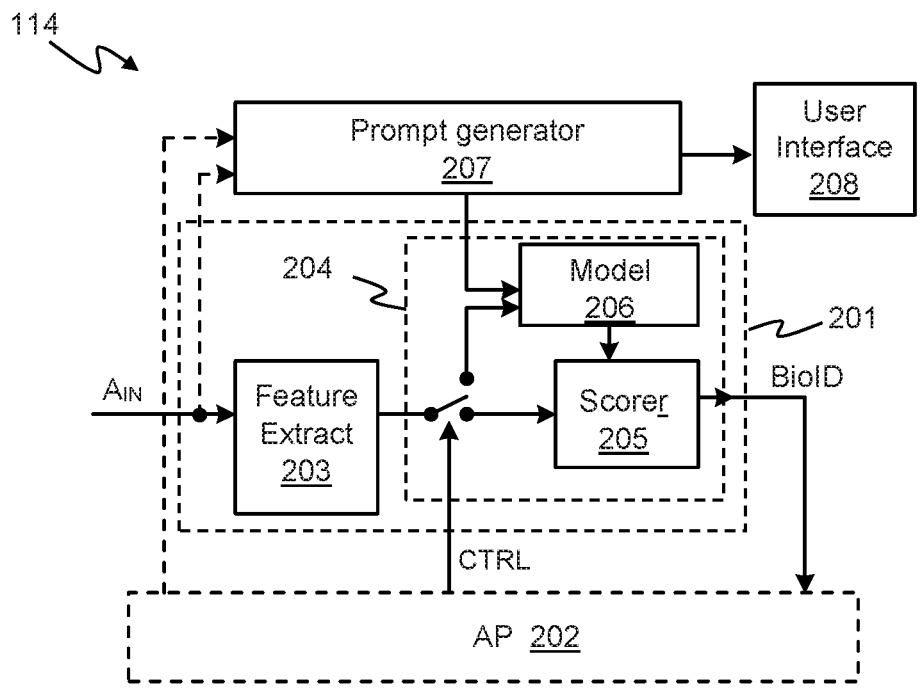
FIG. 2 illustrates an example of a speaker recognition apparatus according to an embodiment.

FIG. 2 illustrates one example of a speaker recognition module 114. The speaker recognition module 114 has an input for receiving audio data in the form of an input audio signal $A_{IN}$ corresponding to speech sounds uttered by a user. Speech sounds at least refers to any sounds that may be vocalized or uttered by a user. As will be described in more detail below, the speech sounds may be uttered in response to a prompt.

The audio signal input signal $A_{IN}$ may be received from an onboard microphone 108 of the host device or a microphone of a peripheral apparatus connected to the device via an interface 112 or communicated from a remote device. The audio input signal $A_{IN}$ may have been subjected to some initial processing, which may, for instance, have detected that the audio signal corresponds to speech of a user.

The audio input signal may be provided to a recognizer 201, which may process the audio data for speaker recognition purposes. Depending on a mode of operation, which may be controlled by a received control signal CTRL received from some other component of the device, e.g. an applications processor (AP) 202, the recognizer 201 may process the received audio data to determine characteristics of the audio signal that can be used for speaker recognition. This process may be part of an enrollment process for enrolling a new user or may be part of an identification and/or verification purpose for determining or verifying the identity of an enrolled user.

The recognizer 201 may operate in a known way by analyzing the audio data $A_{IN}$ in a sequence of frames as will be readily understood by one skilled in the art.

FIG. 2 illustrates that the speaker recognition processing may be performed in two parts, and the recognizer 201 may comprise a front-end feature extract module 203 and back-end processing module 204. In the feature extract module 203, the speech signal may typically be processed to reduce its dimensionality while maintaining the information desired for speaker extraction by extracting parameters or features indicative of the speech, for example well-known MFCC (Mel Frequency Cepstral Coefficients), or parameters for an LPC (Linear Predictive Coding) model, or TESPAR (Time Encoding Signal Processing and Recognition) parameters. The back end processing module 204 receives these parameters and, for speaker identification/verification, a scorer 205 may compare such features against parameters from a model 206 for one or more previously registered users. The scorer 205 may typically derive a score for each frame, representing, in some way, the probability that the parameters from the received audio input signal correspond to those of a pre-enrolled user rather than someone in the population at large. The scores from many frames may be combined to give a final indication BioID as to whether the user corresponds to one of the pre-enrolled users. Depending on the mode of operation, the indication BioID may indicate which of a number of registered users is likely to be the current user, possibly with a confidence level based on the final combined score or may simply indicate whether or not the current user is verified as a particular pre-registered user above some confidence level. The indication BioID may be provided to some other part of the device, such as an applications processor 202.

The speaker model for a given user may be determined during an enrolment mode of operation. During the enrolment mode of operation, audio data corresponding to speech sounds uttered by a user may be received and features extracted by the feature extract module 203 as discussed above. These features may be fed in enrolment mode directly to the model 206 and may be combined with previous feature data using known techniques to determine and/or store the relevant parameters for the model for that user.

In some instances, speaker recognition for identification may be enabled and performed for substantially any audio data received corresponding to speech of a user. For example, if two or more users are registered as a user of a device, the identity of the present user may be determined or confirmed any time a spoken command is identified so at least some aspects of device operation can be tailored according to a profile for that user, although in some embodiments it may be sufficient to apply speaker recognition to a first spoken command and assume that the user does not change for a certain time and/or as long as the device is continuously used. In some embodiments, however, speaker recognition for identification/verification may only be required at certain times, for instance as an authentication step associated with certain actions that are highlighted as requiring authenticated permission, and thus speaker recognition may only be performed following some suitable control signal.

In embodiments of the present disclosure, the audio signal processed for speaker recognition purposes may correspond to speech which comprises at least some utterances that the user has been specifically prompted to utter at that time.

A prompt generator 207 may therefore be configured to generate a prompt for the user to utter one or more specific vocal sounds, for example to prompt the user to say one or more specific keywords as at least part of the speech to be analyzed.

Using a prompt in this way can provide additional security as part of an authentication process by combining speaker recognition with speech recognition to provide an indication of presence of the speaker. An authentication system based purely on speaker recognition could potentially be vulnerable to being spoofed by a recording of a user. If, however, at the time authentication is required the user is prompted to say one or more specific keywords, that vary from one authentication attempt to the next, then speech recognition could be used to determine that the speech corresponds to the correct prompt and speaker recognition could be used to determine that the speaker is the correct user. To provide sufficient security, a relatively large list of possible keywords may be stored and the keyword or keywords selected for the prompt used for any authentication attempt may be selected at random. In some instances, additional security may be provided by presenting the user with a choice of possible keywords with the correct keywords or sequence of keywords being encoded in some way known to the user.

Speaker recognition is concerned with determining the identity of a speaker and thus is concerned with determining whether a given sample of speech corresponds to a known user based on various characteristics of the speech. It has been appreciated by the present inventors however that some speech sounds may be more characteristic of a speaker than others. In other words, some speech sounds may be better for discriminating whether or not the utterance was made by a particular user than other speech sounds.

For example, at least in some operating conditions, speech sounds that involve relatively strong resonances in the vocal tract of a user, e.g. nasals or vowels or voiced speech, may provide a better degree of discrimination than speech sounds such as plosives or unvoiced speech that do not excite such resonances. The vocal tract of a human generally includes the pharynx, the oral cavity, and the nasal cavity. Sounds which involve resonances of the vocal tract will depend, at least partly on the physical dimensions of these cavities and thus on a physiological characteristic of an individual. The vocal tract of an individual user will likely be physiologically unique, and such resonances can thus provide useful information for discriminating between different speakers. By contrast, speech sounds, such as plosives for example, which may not include any strong resonance, may contain less useful information for speaker identification. In fact, at least in some operating conditions, such speech sounds may actually be detrimental for speaker recognition, albeit possibly useful for speech recognition.

Sounds may be categorized as voiced or unvoiced sounds, or voiced or unvoiced speech. Voiced sounds are those associated with vibration of the vocal cords and for instance be articulated using the vocal cords. Unvoiced sounds do not tend to involve vibration of the vocal cords. Voiced sounds thus excite the vocal tract and tend to have some structure in the sound and have well defined formants. Voiced sounds or voiced speech includes vowels and nasals. Unvoiced sounds do not significantly excite the vocal tract and tend to have a more random structure in the sound. Voiced speech tends generally to have better SNR than unvoiced speech and may, in at least some environments, provide good discrimination for speaker recognition.

Embodiments of the present disclosure thus relate to apparatus and methods for generating a prompt to be vocalized by a user for the purposes of biometric speaker recognition in which the prompt is one which has been deliberately chosen to be useful for speaker recognition processing. In other words, the prompt is deliberately chosen to be one that causes a user to utter speech sounds that are useful for discriminating between users in a speaker recognition system. The prompt may for instance be chosen to be a prompt to utter speech sounds that result in relatively strong resonances in the vocal tract of the speaker.

Figure 3:
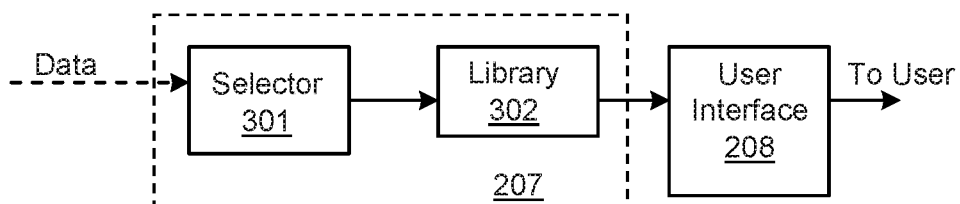
FIG. 3 illustrates a prompt generator according to an embodiment.

FIG. 3 illustrates an embodiment of a prompt generator 207 for generating a prompt to be vocalised by a user biometric speaker recognition according to an embodiment. The prompt generator has a selector 301 for selecting at least one voice prompt element to form at least part of the prompt from a predetermined set of voice prompt elements. The predetermined set of voice prompt elements may be stored in a library 302 of voice prompt elements.

The voice prompt elements may comprise or relate to keywords for the user to utter. The term keyword does not necessarily mean a word that has a defined meaning in a given language, and the set of keywords may include names or made-up or nonsense words. In some instances, the voice prompt elements may not be complete words as such but may be prompts for specific speech sounds, e.g. specific phonemes or other speech segments such as senones, and a plurality of voice prompt elements made be selected to prompt the user to utter a selected sequence of speech sounds. In some instances, the voice prompt may be a prompt to say a word of interest by presenting a prompt to the user which is semantically related to the word of interest. For example, if the word of interest for the user to utter is "banana", the prompt could be to display an image of a banana. For ease of reference, the following description shall refer to an example where the voice prompt elements comprise keywords, but it will be understood that these other voice prompt elements could additionally or alternatively be used.

In operation, the selector 301 provides a signal to select one or more of the predetermined set of keywords from the library 302 of pre-stored keywords. Selected keywords are then transmitted to a user interface 208 to be presented to the user as the prompt to be spoken. The user interface 208 may comprise a physical transducer, for example, a display screen and circuitry to drive the transducer. The prompt may be presented to the user in a variety of different ways. For example, the text of the keyword(s) may be communicated by text displayed on a display screen, such as screen 102 of device 100, to prompt the user to speak this word. Alternatively, the keyword may be output via some other transducer, such as a loudspeaker for the user to repeat, for example if a user is likely to be visually impaired. The user interface 208 for presenting the prompt to the user may be part of the same device as the prompt generator 207, but, in some implementations, the prompt generator 207 may be remote from the user interface 208. For instance, if a device, such as a smartphone, is used to try to access some functionality of a server and some authentication is required, the voice capture may be done by the smartphone and communicated to the server for authentication. In such a case, the choice of prompt may be made by server and communicated to a user interface on the smartphone.

The prompt to the user may comprise more than one keyword, i.e. may be a string of words or a phrase, to obtain more speech information to analyze without multiple iterations of prompt and response. In some embodiments, the chosen keywords for the user to utter may also be presented alongside other words in some coded fashion, e.g. based on position in a pattern of display, number in a sequence, color of presentation etc. so that an authorized user that knows the code can select the correct keywords to utter and, in some embodiments, the sequence thereof and thus also establish that they know the code.

The set of predetermined keywords, i.e. voice prompt elements, stored in the library 302, may be sufficiently large that the choice of keyword or keywords can be varied for successive prompts so as to avoid undue repetition of the same keywords. One use of the prompt may be to provide additional security for an authentication process, in which case it may be advantageous to use a relatively large set of possible keywords so as to reduce the likelihood that a user could be recorded saying all the possible keywords with the relevant recording later replayed by a malfeasor in response to the prompt.

In at least some embodiments, the keywords stored in the library 302 that form the predetermined set are all deliberately selected to be keywords that are, in at least some operating conditions, particularly useful for speaker recognition purposes, in that in saying the relevant keyword, the user will utter speech sounds that are particularly discriminative between users. The keywords may also avoid too many speech sounds that may, in some circumstances, be detrimental for speaker recognition. However, in some embodiments, for example where the authentication may comprise speech recognition of keywords in parallel with speaker recognition, the library may comprise some keywords that are somewhat less useful or even detrimental for speaker recognition but are particularly valuable for speech recognition. In some embodiments the selector may be configured to select at least one keyword which is useful for speaker recognition and also at least one keyword which is useful for speech recognition.

The keywords may be selected to be those that, when spoken, include speech sounds that excite strong resonances in the vocal tract of the speaker such as voiced speech, e.g. nasal speech sounds and/or vowel speech sounds.

In some instances, the keywords may be selected based on a keyword discrimination score. A keyword discrimination score may be an indication of how useful that word is likely to be in speaker recognition for discrimination between different speakers. The keyword discrimination score provides an indication of the ability of the relevant keyword to provide discrimination between different users. The keyword discrimination score in general may be indicative of the ability of the keyword to discriminate between users at a general population level, that is if each of a significant number of individuals were to utter some keywords which keywords would be usefully discriminative for a significant number of individuals. It will of course be appreciated that an individual keyword which is useful for discriminating between some speakers may actually not be that useful for discriminating between two specific individuals. In some instances, the library of keywords may be populated with keywords that have a keyword discrimination score above a certain threshold and thus which provide discrimination between different users above a predetermined threshold level.

A keyword discrimination score to be associated with a keyword could be determined in a number of different ways. For instance, for at least some keywords, a keyword discrimination score may be obtained by empirical studies, e.g. by getting a sample population of speakers to dictate a set of keywords, possibly in various environmental conditions, and evaluating which words produce the clearest or clearer inter-speaker discrimination under the respective conditions.

For at least some keywords, a keyword discrimination score to be associated with the keyword may be obtained by analyzing the phoneme content of each word, and scoring the word based on data on which phonemes or classes of phonemes lead to the best discrimination, based on experimental data and/or modelling of speech sounds and speaker populations. As described above, vowels and nasal sounds may result in good discriminatory audio signals since they excite many vocal tract resonances, whereas plosives are generally poor, since they largely only employ the lips. Thus, a keyword with some pronounced nasal or vowels speech may have a better keyword discrimination score than one with mainly plosive speech sounds. Other speech segments may also be useful for analysis such as senones. As will also be understood be one skilled in the art in continuous speech a particular sound, e.g. phoneme, may be influenced by the sounds preceding and following it in speech. Triphones may be identified based on the context of the phone and senones are parts of a sound that may be used as a detector for a start of a triphones.

In some embodiments, the selector may be configured to select the keyword from the library 302, i.e. to select the vocal prompt element from the predetermined set of vocal prompt elements, based at least partly on data regarding the operating conditions for the speaker recognition processing. In some embodiments, the selection of the keyword from the library 302 may be based on an indication of acoustic environment in which the speech is uttered. The indication of the acoustic environment in which the speech is uttered may, in particular, comprise an indication of noise in the data, for example background noise.

It has been appreciated by the present inventors that noise in the audio signal used for speaker recognition can greatly impact the reliability of the speaker recognition processing and further that the impact of noise may be different for different speech sounds.

A speech sound, such as a plosive, may exhibit less variation (at population level) in the parameters useful for speaker recognition between different speakers than a speech sound that excites a strong resonance of the vocal tract of the speaker, such as a vowel or a nasal. In low noise conditions, plosives may usefully contribute somewhat to speaker recognition. It has been found, however, that in the presence of noise, the ability to match a plosive speech sound uttered by a user to a model for that user can be significantly degraded. For conventional speaker recognition processing, this noise can significantly impact on the ability to correctly identify a speaker who is a registered user as being that registered user. In conventional speaker recognition, as described above, the confidence scores derived for multiple frames of audio data corresponding to speech of a user are combined to give an overall confidence level or effectively an indication as to whether or not the speaker is a particular registered user. Frames of audio data that correspond to plosive speech sounds in the presence of noise can result in very low confidence scores, even for the correct speaker, which, when combined, reduce the overall confidence level significantly, resulting in an unacceptably high false rejection rate (FRR).

Figure 4:
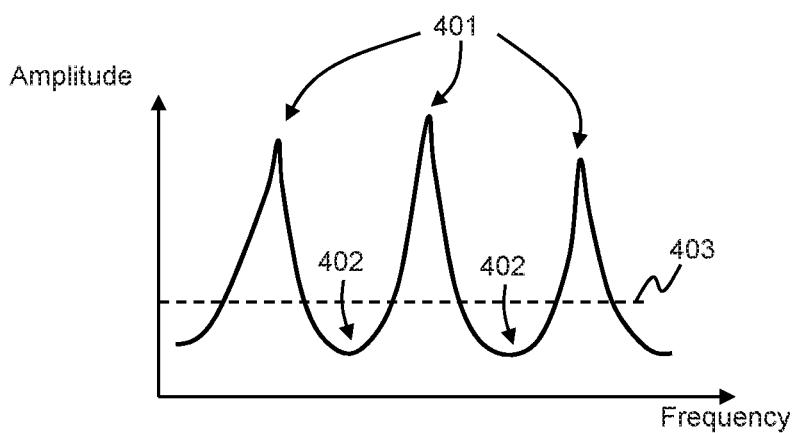
FIG. 4 illustrates a hypothetical spectrum for a speech sound.

Speech sounds that result in relatively strong resonances in the vocal tract of a user may, in general, allow for better discrimination between users (at population level) as the resonance will depend on physiological properties of a user. Two such speech sounds are vowels and nasals. Such speech sounds may produce a spectrum for the speech sound which exhibits strong formants, i.e. a concentration of acoustic energy in a speech sound around a particular frequency. FIG. 4 illustrates a hypothetical spectrum of a speech sound to illustrate the principles of formants. FIG. 4 shows the envelope of amplitude, i.e. acoustic energy or sound pressure level of the speech sound, against frequency and, in this hypothetical example, there are three clear formants, which may for instance be related to resonances of the pharynx, oral cavity, and nasal cavity with formant peaks 401 and formant nulls 402. In reality, for a given speech sound, there may clear peaks but less clearly defined nulls or vice-versa.

Nasals may be useful for discrimination due to a strong resonance in the nasal cavity, which tends to be relatively consistent as the shape of a user's nasal cavity may not vary much over time, whereas a resonance of the oral cavity can depend on the shape of the mouth which is influenced by the preceding and succeeding speech sounds. For nasals, however, the features which may be of most use for comparison with the speaker model is the arrangement of formant nulls, i.e. the frequencies of minima in the spectrum of the speech sound due to anti-resonances. Nasals may therefore be usefully utilized for speaker recognition purposes, provided that the relevant formant nulls can be sufficiently identified.

In low noise conditions, the formant nulls may be relatively clear, and thus a nasal speech sound can usefully be utilized for speaker recognition processing with a relatively high confidence. In the presence of noise, however, especially with a background noise spectral density as close to, or higher than, the speech signal density around these nulls, it may be harder to determine the formant nulls accurately, and the ability for nasals to usefully contribute to speaker recognition may diminish. For example, consider a relatively broadband noise spectrum indicated by dotted line 403. In such a case, it may be difficult to accurately determine the presence or location of formant nulls leading to an increase in FFR and/or FAR.

Vowels also tend to excite relatively strong resonances, but for vowels, the indicators most useful for discriminating between different speakers are the formant peaks. The formant peaks of vowel speech sounds may be less strongly discriminative than the formant nulls of nasal speech sounds, but the arrangement of the formant peaks may be determined relatively accurately even in the presence of relatively significant noise.

Some keywords may therefore be better in the presence of background acoustic noise while others may be better in quiet environments. Thus, in conditions of low background noise, the selector 301 may be configured to preferentially select keywords that, when spoken, result in relatively strong nasal speech sounds. However, in the presence of relatively significant background noise, the selector 301 may preferentially select keywords that, when spoken, result in relatively strong vowel sounds and/or may avoid keywords that result in nasal speech sounds. The selector 301 may thus base the decision on the keyword to be selected on the level of noise, at least up to some threshold noise level beyond which the noise may be so high that it is determined that no sufficiently accurate speaker recognition processing can be performed. If the noise is above a certain threshold level, it may not be possible to use any speech sound accurately for speaker recognition and the selector may signal that no prompt should be issued for the user to utter and/or the user should be notified that the present conditions are too noisy.

In some embodiments, the library 302 may therefore comprise a plurality of subsets of keywords, i.e. subsets of vocal prompts, with the various subsets comprising keywords that are useful for discrimination in certain operating conditions, such as noise levels.

For instance, there may be a first set of keywords that may be useful for discrimination, i.e. would have good keyword discrimination scores, in quiet environments and a second set of keywords that may be useful for discrimination, i.e. would have good keyword discrimination scores, in noisy environments. The selector 301 may receive an indication as to whether the audio input corresponds to a quiet or noisy environment and select the keyword or keywords to form the prompt from the relevant subset accordingly. In some instances, the various subsets may be mutually exclusive from one another, but in some instances, some keywords may appear in more than one subset.

In some embodiments, the sensitivity of at least some keywords of the library 302 to various environmental inputs may be stored local to the selector 301, for instance as a look-up table of a keyword discrimination score versus an environmental parameter, such as background noise, or as a table of coefficients of some function, for example a linear or polynomial or piece-wise-linear function.

Thus, for example, data to assist in the keyword discrimination score generation may comprise a table such as Table 1 below.

TABLE 1

| Keyword | Noise Level | | |
| --- | --- | --- | --- |
| | Low | Medium | High |
| Bananarama | 10 | 3 | 0 |
| Popocatepetl | 2 | 4 | 2 |
| Aarhus | 4 | 6 | 8 |

Table 1 illustrates three example keywords and a sample keyword discrimination score for each and how it may vary according to three categorizations of noise: low, medium and high. The keyword discrimination score in this example varies from ten being high to indicate a high usefulness for discrimination to zero being low to indicate a low usefulness for discrimination.

The word "Bananarama" comprises mainly nasal sounds, so it is a good discriminant in quiet situations. However, it is likely to generate spurious values in noisy environments. Hence, it may have a high keyword discrimination score for low noise environments, but the score may drop rapidly as noise increases. The word "Aarhus" contains no nasals, but does include a long 'A' sound which may produce formant spectral peaks well above the noise. Thus, it may have a discrimination score which increases with noise, as the keyword is likely to be more useful in such operating conditions. The word "Popocatepetl" comprises many plosives, but these plosives are of little discriminatory value. It also includes several vowels, which may be useful in noisy conditions. However, for some speaker recognition systems, in noisy conditions, plosive speech sounds may actually tend to reduce confidence in speaker identification. Thus, in relatively noisy environments, such a keyword is not preferred. Some speaker recognition systems may, however, use not only the spectral characteristics of the speech sounds but also use other information, such as the way the word is spoken to help discriminate between users. The word "Popocatepetl" is a relatively long word with many syllables, and its prosody (the manner in which it is spoken) may also give additional speaker-dependent clues to speaker recognition systems sensitive to such clues.

The library 302 may therefore comprise the predefined set of voice prompt elements, e.g. keywords and an indication of a keyword discrimination score and how the keyword discrimination score varies with one or more operating conditions, such as noise. The selector 301 may operate to select a keyword based on the received indication of current operating conditions and in accordance with some selection criteria. It would be possible to select the keyword with the best keyword discrimination score for the present operating conditions, however, this selection could result in the same keywords being likely to be repeatedly selected for the prompt. Reusing the same keyword as the prompt repeatedly makes the system more vulnerable to being spoofed by a recording of the user's voice saying the keyword. For authentication systems, it may therefore be advantageous to ensure that the same keyword is not likely to be repeated too frequently.

As mentioned above, the keywords could be grouped into various subsets for different operating conditions, and the keyword selected at random from the appropriate subset. In some implementations, the selector could identify the 'top-n' keywords, i.e. the group of a certain number n of keywords with the best keyword discrimination scores, for the current operating conditions and select one of that group at random. The selector 301 may be configured to select at random a keyword with a keyword discrimination score over a threshold level where the library of keywords and threshold level are selected so that there is always a plurality of keywords to choose between for any expected operating conditions. In some embodiments, the selector may be configured to select a keyword to form at least part of a prompt only if that keyword has not been included in a certain number of previous selections and/or has not been selected as a prompt previously within a certain time window. In some embodiments, the selector may be configured to select a sequence of keywords to form at least part of a prompt and the sequence, i.e. the order of the keywords, may be chosen at random or modified if that keyword has already been included in a previous selection within a predetermined time window or number of selections.

The selector 301 may thus select the keyword from the library 302 based, at least partly, on an indication of the noise level of the audio signal corresponding to the speech sounds uttered by the user.

In some implementations, an indication of noise in the audio signal may be determined by the prompt generator 207. For example, in some embodiments, the prompt generator 207 may comprise a noise estimation module (not separately illustrated) coupled to an input for receiving the audio signal $A_{IN}$. This noise estimation module may, for example, monitor the signal level in frames where the signal level is low, e.g. apparent silence due to short or longer gaps in speech. In some embodiments, however, an indication of noise may be determined by some other module(s) or component(s) and communicated to the selector 301.

The indication of noise may be an indication of the noise level, either in absolute terms or relative to the signal level for the speech sounds uttered by the user, i.e. an indication of the signal-to-noise ratio. Additionally or alternatively, the indication of noise may comprise an indication of the noise frequency or spectrum. For a relatively significant noise component at a particular frequency, the frequency and/or frequency spread of the noise may be useful to determine whether or not particular speech sounds may or may not be useful for speech recognition processing. In some implementations, the indication of noise may comprise an indication of various categories of noise, for instance noise may be classified as being narrow-band noise, e.g. interference, broadband noise, general noise or multipath noise, reverberation. The keywords in the library 302 could be formed into various subsets of keywords that are good or bad for different types of noise and/or which have keyword discrimination scores for various types of noise, and the selector 301 may thus use the appropriate subsets and/or scores for selection of the keywords.

There is a variety of data regarding the operating conditions that may be useful in selecting an appropriate prompt that would be useful for speaker recognition at that time. For instance, any data that indicates whether a particular speech sound, or class of speech sound, or type of formant data will be masked, or distorted in the audio signal may be useful. The library 302 may group the keywords into various subsets based on the speech sounds or type of speech sounds that they contain when spoken, for instance by associating metadata with each keyword. Metadata information that indicates that a particular speech sound is likely to be distorted or masked may result in the selector 301 not choosing keywords that feature such speech sounds. Likewise, any data that a particular speech sound or class of speech sound is likely to be particularly relevant or irrelevant for one or more of the registered users may be usefully utilized to decide appropriate keywords.

Figure 5:
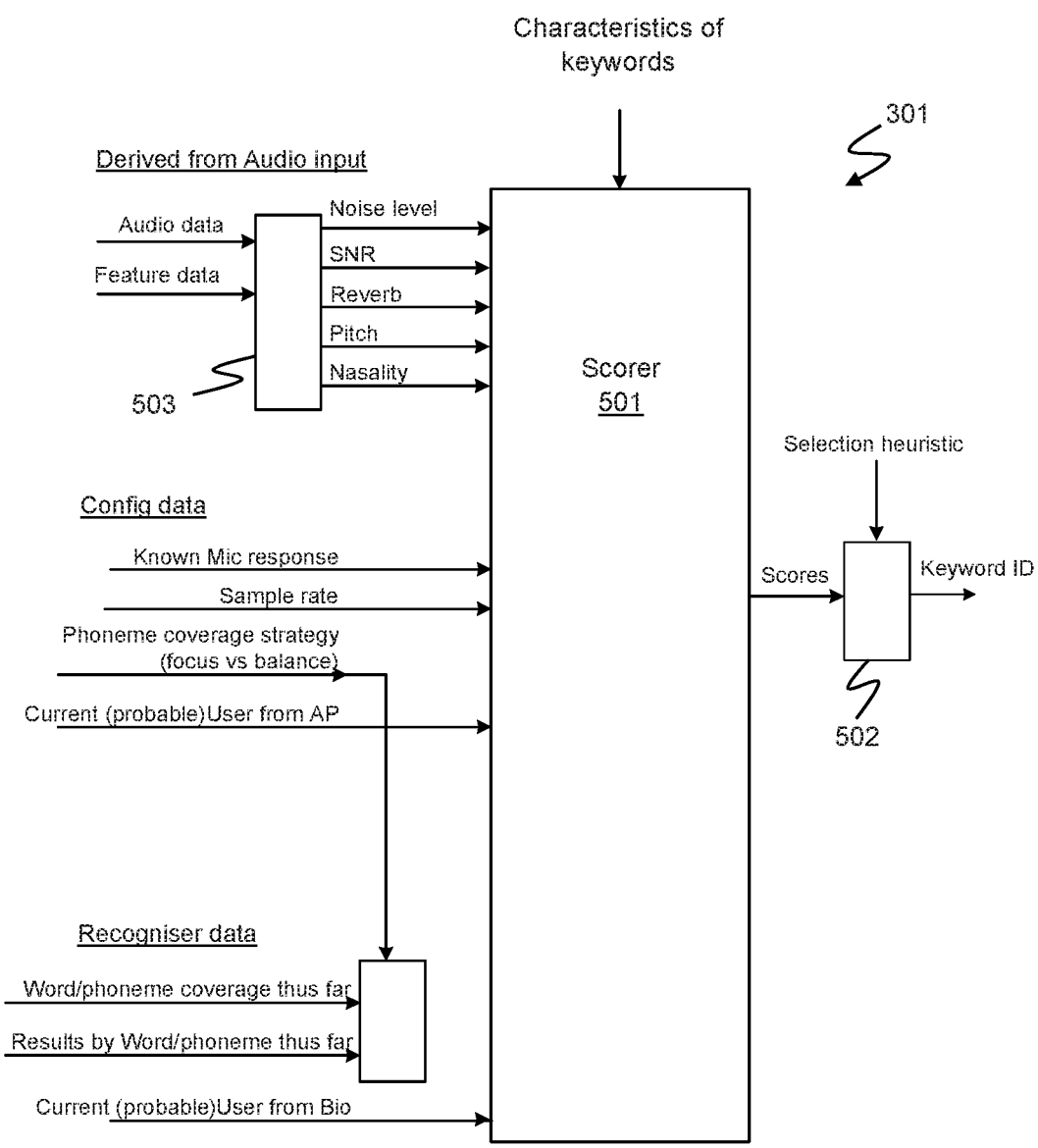
FIG. 5 illustrates a voice prompt selector according to an embodiment.

FIG. 5 illustrates generically a selector 301 with other ancillary inputs.

The selector 301 comprises a discrimination scorer 501, which is arranged to receive data regarding the characteristics of the predetermined set of keywords stored in the library 302. These characteristics indicate how useful the keywords may be for discrimination. These characteristics may, for instance, comprise metadata regarding subsets in which each keyword is classified, an indication of at least the main speech sounds contained within the keyword and/or keyword discrimination scores. The discrimination scorer 501 may be arranged to receive at least some data regarding the current operating conditions for speaker recognition and determine a discrimination score for each keyword based on the current operating conditions. The keywords scores may be provided to a decision module 502 which applies a selection heuristic to select one or more of the keywords based, at least partly, on the score and output the identity of the selected keyword or keywords.

In some embodiments, various properties of the audio signal may be used to generate the discrimination score for a particular keyword.

As mentioned above, the noise in the audio signal may be determined, for example by an analysis module 503 of the prompt generator 207 or some other upstream module. Noise may be measured in frames of the audio data, which are identified as corresponding to voiceless frames of speech. The indication of noise may comprise the noise level, at least in one or more frequency bands and may comprise the absolute level and/or the noise level relative to an indication of signal amplitude, e.g. SNR (signal-to-noise ratio). The indication of noise may additionally or alternatively include an indication of the spectrum of the noise, especially any interference tones or band-limited components. Likewise, the ancillary data determined from the audio signal may comprise an indication of any detected reverberation. This detection may indicate that some particular likely formants are likely to be difficult to detect which may indicate that certain keywords may be less useful for speaker recognition purposes in the presence of such noise.

Data obtained from the audio signal may comprise an indication of a speech characteristic derived from speech sounds previously uttered by the user. One such speech characteristic of interest may be the general pitch of the speech sounds in the audio data, i.e. the general pitch of the present speaker. Knowing the pitch of the current speaker again may indicate whether certain formants of certain speech sounds are likely to be of use. For example, for generally higher pitched speakers, certain speech sounds may result in some formants, that would usually be useful for discrimination, being located in high frequency noise for the audio channel or corresponding to some known interference tone. Keywords containing such speech sounds may therefore be of less use for higher pitched speakers. The discrimination score for a keyword for a given speaker may therefore be set based on the indication of pitch of the speaker. The pitch of the speaker may be determined by analysis module 503 of the prompt generator 207 or determined elsewhere and communicated to the selector 301.

In some embodiments, an analysis module 503 may analyze the audio data and/or feature data extracted by the feature extract module 203 to determine other characteristics of the general speech of the current speaker. For example, an indication of nasality may be derived indicating the extent to which the speech has a nasal pattern. Especially if none of the registered users have a particularly nasal voice characteristic, this situation could indicate nasal distortion for instance due to a cold or other condition affecting the nasal cavity. This scenario could prompt the discrimination score to give less weight to keywords that have significant nasal speech sounds in such circumstances.

In some embodiments, ancillary information regarding a configuration of the speaker recognition system may be used by the discrimination scorer 501. Such configuration data may be received, at least partly, from some external component, possibly from a system controller, e.g. an applications processor or the like. For applications where the audio data is captured remotely by some audio capture apparatus, at least some of the configuration data may be received from such remote apparatus. For applications where a particular on-board microphone is always used for generating the audio signal, the audio channel between the microphone and the speaker recognition module is fixed at least some aspects of the configuration data may be stored in a memory.

Such configuration data may comprise information regarding a parameter of an acoustic channel for generating the audio data. The parameter of the acoustic channel may comprise a parameter of the microphone device used to capture the speech sounds from the user or a parameter of the signal path between the microphone and the speaker recognition module or a parameter of the acoustic path from the speaker to the microphone via a sound inlet. The parameter of the acoustic channel may thus be a parameter of the microphone used to capture the speech sounds, for instance, a known response of the microphone and/or knowledge of imperfections associated with the microphone.

The parameter of the microphone may for instance comprise a known microphone resonance. This resonance could accentuate noise in some band and hence make some formant signals less reliable for speaker discrimination. Additionally or alternatively, a parameter of the microphone taken into account by the discrimination scorer may comprise the bandwidth of the microphone. A low bandwidth may again accentuate noise and/or attenuate useful signal in certain bands, meaning that certain speech sounds will be less useful for accurate speaker recognition. These parameters may be known for an on-board microphone, and thus a component, such as the applications processor, could signal to the selector 301 when the audio signal is generated using the on-board microphone. In some instances, parameters regarding an external microphone could be communicated along with the audio signal.

The parameter of the acoustic channel may comprise the sample rate of a digital part of the acoustic channel. If the sample rate is low, this may limit the usable bandwidth/formants and make higher formant signals lesser value in terms of usefulness for discrimination between users.

The parameters of the acoustic channel may therefore influence the discrimination scores determined for keywords that comprise at least some speech sounds or classes of speech sound.

In some embodiments, the indication may be an indication of at least one enrolled user profile. As discussed above, users will go through an enrolment process in order to subsequently use speaker recognition for identification/verification. Data stored for each enrolled user may comprise a user profile for that user.

In some instances, the identity of a user of interest for speaker recognition purposes may be known, and thus, the relevant user profile which is of most interest for the speaker recognition processing may be known. For instance, consider a device such as a smartphone. There may only be a single registered user for voice control of the device or at least for performing certain actions on the device, and voice verification may be used as a level of authentication for certain functions. For example, if a user issues a voice command which involves invoking a permission which is set for a single registered user, e.g. "show Alice's private diary", the recognizer may be set to verify if the speaker is indeed Alice. Alternatively, due to other context, the possible identity of the user may be known, for instance a user may be logged into a certain level but requires further authentication. In such cases, the identity of the person it is wished to verify is known, and thus the most relevant user profile is known. The general speech characteristics of that person will also be known as part of the user profile, as that user is an enrolled user. It may be that certain speech sounds may be particularly useful for discriminating between that person and someone else who may have acquired the device, and/or certain speech sounds may be particularly poor for speaker recognition of that individual, for example if the individual has a speech impediment such as a lisp. The discriminator scorer 501 may therefore set the scores for the keywords based on the characteristics of the keywords and how useful the speech sound(s) contained in the keyword is/are known to be for verifying whether the speaker is that user, i.e. for the relevant user profile.

Even where there is more than one registered user, it may be known which speech sounds or classes of speech sound are likely to be most useful for discriminating between those registered users based on the user profiles, and thus the speech characteristic of the registered users may be used to select appropriate keywords to be used for the user prompt.

In some embodiments, a relevant user profile for the speaker recognition may or may not be known in advance, but as part of the speaker recognition processing, a particular user profile may be identified as being most relevant for further processing. The process of speaker identification or verification may require a certain number of keywords to be spoken before the recognizer decides whether or not the current user corresponds to any particular user. During the speaker identification processing, a likelihood score for each of the registered users may be determined and updated as new audio data is processed. Feedback from the recognizer may indicate the most likely candidate user profile (or the top number of candidate user profiles), and details regarding the speech characteristics of such a user profile may be used to determine the keywords that are most useful for determining whether the current speaker matches that user profile. This determination may help speed up the overall speaker recognition process, as once a likely candidate is identified, further keywords may be selected that most help to verify whether or not the current speaker is that user.

In some embodiments, the degree of matching between a user profile of interest and the current speech data for particular types of speech sounds may be determined. For example, if the speaker recognition processing so far indicates a good fit to a relevant user profile except for nasal sounds, which may possibly be distorted due to the user having a cold, then keywords corresponding to nasal speech sounds may be less preferentially selected.

In some embodiments, it may be useful to provide feedback from the recognizer regarding the current results of matching even if a particular user profile of interest is not known. Information regarding the matching results for particular speech sounds or types of speech sounds may indicate which sounds have proven to be useful or not for the speaker recognition processing so far, in the current operating conditions. Keywords that contain the most useful speech sounds may be selected ahead of keywords that correspond to less useful speech sounds. For example, if the recognizer results for a particular class of speech sounds are resulting in consistent scores for a given user, this result may indicate that those speech sounds are useful for discrimination, especially if the scores are relatively high or relatively low. However, if a certain class of speech sounds have scores that vary significantly from one vocalization to another, this variation may actually indicate that the class of speech sounds is not good for discrimination in the current operating conditions.

In some embodiments, the score for a keyword may also be based on previously selected keywords used for a prompt as part of the same speaker recognition processing. In particular, the discrimination score for a keyword may be based on the number of previous keywords having similar characteristics, e.g. the same general type of speech sounds. For instance, if the keywords selected previously were such that there have already been several instances of a particular speech sound, it may be beneficial to preferentially select keywords that correspond to other speech sounds, which will also be useful for the current operating conditions, to allow other speech sounds to contribute. For speaker enrollment, it may be beneficial that the model is based on a range of different speech sounds, and thus avoiding an undue number of repeated instances of the same speech sound may help provide a more robust model for that user. For speaker identification/verification, it is possible that two different users may say one particular speech sound in a way that is quite similar in terms of the features used for speaker recognition but vary in other speech sounds. In some instances, therefore increasing the diversity of the speech sounds that contribute to the overall confidence score may improve speaker recognition performance.

The score and selection decision of a keyword to be generated as a prompt to the user may thus be based on a combination of many diverse inputs or factors. An embodiment may implement one or more different methods of combination. The combination may be implemented as some weighted average or mean of respective scores arising from the factors, for instance an arithmetic or geometric or root-mean-square average. The combination may be some non-linear combination, for instance any keyword whose score for any individual factor is below a respective threshold may be blocked in a sieve type of algorithm. The factors may be allocated respective priorities, and the sieve process started with the highest priority factor and progressing through the factors in decreasing order of priority. For instance, the noise level might be considered higher priority than the general pitch of the user's voice. The process may be terminated once the pool of possible keywords has reduced to some minimum number to allow enough remaining diversity to act as a pool for providing adequately randomized prompts.

Figure 6:
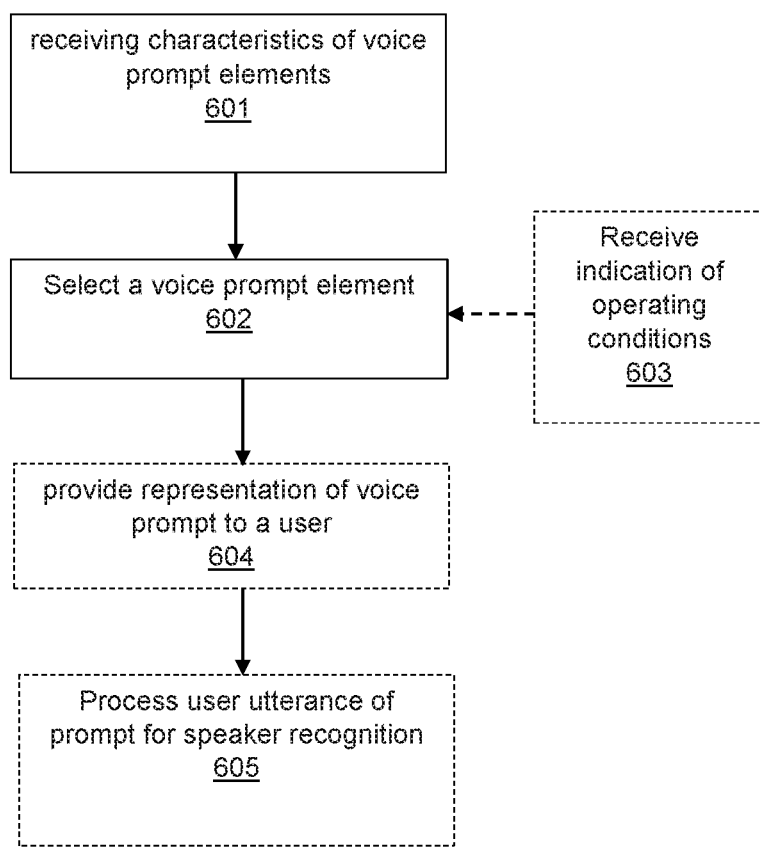
FIG. 6 illustrates an example of a method according to an embodiment.

FIG. 6 illustrates a flowchart of a method according to the present disclosure. The method involves receiving, as shown in box 601, characteristics of a set of a plurality of predetermined voice prompt elements. The characteristic of the voice prompt elements, e.g. keywords, may comprise an indication of how useful the relevant keyword is for speaker recognition and may comprise an indication of how useful the relevant keyword is for speaker recognition is in various operating conditions. In some embodiments, the characteristic may comprise an indication of a keyword discrimination score. In some embodiments, the characteristic may comprise an indication of speech sounds that would be expected to be uttered by a user uttering the relevant voice prompt element. In embodiments, the characteristic may comprise an indication of the operating conditions in which the voice prompt element may be of use.

Based on the characteristics of the voice prompt elements, the method involves selecting (box 602), one or more voice prompt elements to form at least part of a voice prompt to be presented to a user. In some embodiments, the method may comprise receiving an indication of the current operating condition for speaker recognition (box 603), and the selection of the voice prompt may be based on the operating conditions as described previously.

The selected voice prompt elements may be communicated to some controller for presentation to a user as illustrated in box 604. The method may comprise providing a representation of the voice prompt elements to the user as a voice prompt and processing (box 605) an audio signal corresponding to utterances made by the user in response to the voice prompt for speaker recognition.

Embodiments of the present disclosure allow for speaker recognition which may be robust in the presence of noise.

The methods and apparatus as described herein may be used for enrollment of user with a speaker recognition system. As described previously, during enrollment, speech from an enrolling user may be processed to determine one or more user models. In embodiments according to the present disclosure, the enrollment may be based on voice prompts which are deliberately selected such that the speech sample of the enrolling user includes speech sounds which are particularly useful for speaker recognition. Choosing voice prompts, e.g. keywords, that ensures that the enrolling user utters speech sound which are of most use for speaker discrimination can improve the speaker model for the enrolled user and hence improve subsequent identification. Also, in some embodiments, if the enrollment occurs with significant noise, the methods and apparatus of the disclosure can choose voice prompts that are less prone to error and provide the most discrimination for the current operating conditions and again improve the validity of the user model. In some embodiments, different user models based on different voice prompts could be determined. Subsequently, during an authentication step, the relevant model could be selected based on voice prompts appropriate for the then current operating conditions.

The methods and apparatus as described herein may be additionally or alternatively be used for identification/verification of a user. In some embodiments, issuing a voice prompt to a user that is selected to be useful for discrimination may simply improve the reliability of the speaker recognition for identification, especially if the voice prompt is selected to take current operating conditions into account, in which case it may be assumed that the speaker will utter the relevant voice prompt and no speech recognition may be required. In some embodiments, however, presenting a voice prompt to a user may form part of the security of the authentication process, in which case the voice prompts may be selected so as to comprise at least some voice prompts that are useful for speech recognition so as to aid in the determination of whether the correct voice prompt was uttered. Each keyword may thus also have a score indicating its usefulness in discrimination between keywords in speech recognition, which may be used in combination with other indications by the scorer 501.

In some embodiments a prompt selected and presented to the user may be communicated to the speaker recognition module to aid in the processing of the resulting audio signal for speaker recognition. Assuming that the user does indeed vocalize the correct prompt that was presented to them then information about the speech sound expected in the audio signal is known. As already mentioned some speech sounds may be more useful for speaker discrimination, in at least some operating conditions, than other speech sounds. In some instances knowledge of the prompt which it is assumed that the user vocalized may help emphasize the parts of the resultant audio signal which are of most use for speaker recognition processing.

As will be understood by one skilled in the art many speaker recognition systems may process the audio signal in a sequence of frames and extract features regarding the characteristics of the voice sounds in that frame. Knowledge of the keyword vocalized by the user may be used to identify those frames which correspond to the speech sounds most of interest and/or those frames of the audio data which may correspond to speech sounds of little use for speaker recognition or which may even be detrimental. In some embodiments the speaker recognition processing may be adapted to preferentially use the frames of audio data corresponding to the speech sounds of most use and/or de-emphasize any contribution of any frames of audio data corresponding to speech sounds of little use. For example only frames corresponding to use speech sounds may be selected for speaker recognition processing, e.g. to determine a confidence score that the audio data corresponds to a specific user or to form a user model. Additionally or alternatively any frames of audio data which are processed may be weighted based on the expected usefulness, the weighting being used in combining the individual scores from many frames of data.

The discussion above has discussed a speaker recognition module including the prompt generator 207 and the prompt generator including the library 302. In some embodiments, however, the prompt generator 207 could be implemented remotely from the recognizer 201. Likewise, in some embodiments, the selector 301 may be arranged to receive data from and select a keyword from a remote library.

The formation and/or use of a library of keywords, or more generally vocal prompt elements, where each keyword or vocal prompt element of at least a subset of the library is deliberately selected for inclusion in the library based on knowledge that it is particularly useful for discrimination for speaker recognition in at least some operating conditions represents another aspect of this disclosure. The keywords for inclusion may be selected based on a keyword discrimination score determined for each potential keyword under consideration. As mentioned a keyword discrimination score may be determined in any of a number of way including empirical testing of a variety of users speaking the keywords, possibly in a range of conditions and/or analysis and modelling of the phoneme content of the keyword, possibly based on models for speech sounds.

A method of forming a library of vocal prompt elements may, for example, comprise identifying a plurality of possible vocal prompt elements such as possible keywords, identifying at least one keyword discrimination score for each of the possible keywords and selecting the library based on the keyword discrimination scores for the keywords and at least one selection rule. For example forming the library or at least a subset of the library may comprise selecting only keywords with a keyword discrimination score above a threshold, which may be a predetermined threshold. The selection may involve determining a keyword discrimination score for a keyword for each of a plurality of expected operating conditions, e.g. background noise. Keywords may be selected only if the relevant keyword discrimination score is above a respective threshold for each of the expected operating conditions, or keyword may be selected for a subset of keywords to be used in a given operating threshold based on the relevant keyword discrimination score.

The skilled person will thus recognize that some aspects of the above-described apparatus and methods, for example the calculations performed by the processor may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments of the invention will be implemented on a DSP (Digital Signal Processor), ASIC (Application Specific Integrated Circuit) or FPGA (Field Programmable Gate Array). Thus, the code may comprise conventional program code or microcode or, for example code for setting up or controlling an ASIC or FPGA. The code may also comprise code for dynamically configuring re-configurable apparatus, such as re-programmable logic gate arrays. Similarly, the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

As used herein, the term 'module' shall be used to at least refer to a functional unit or block, and the functional unit or block may be implemented at least partly by dedicated hardware components such as custom defined circuitry and/or at least partly be implemented by one or more software processors or appropriate code running on a suitable general purpose processor or the like. A module may itself comprise other modules or functional units.

Embodiments of the invention may be arranged as part of an audio processing circuit, for instance an audio circuit which may be provided in a host device. A circuit according to an embodiment of the present invention may be implemented as an integrated circuit.

Embodiments may be implemented in a host device, especially a portable and/or battery powered host device such as a mobile telephone, an audio player, a video player, a PDA, a mobile computing platform such as a laptop computer or tablet and/or a games device for example. Embodiments of the invention may also be implemented wholly or partially in accessories attachable to a host device, for example in active speakers or headsets or the like. Embodiments may be implemented in other forms of device such as a remote controller device, a toy, a machine such as a robot, a home automation controller or suchlike.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein.

The invention claimed is:

1. An apparatus for generating a prompt to be vocalised by a user for biometric speaker recognition comprising:
   a prompt element selector for selecting at least one vocal prompt element to form at least part of said prompt from a predetermined set of a plurality of vocal prompt elements;
   wherein the prompt element selector is configured to select the at least one vocal prompt element based, at least partly, on an indication of operating conditions for the biometric speaker recognition;
   wherein the indication of operating conditions for the biometric speaker recognition comprises one or more of:
      an indication of an acoustic environment in which the at least one vocal prompt element will be vocalised;
      an indication of reverberation in an audio signal derived from a microphone to be used to receive the vocalised prompt;
      an indication of pitch of sounds previously vocalised by the user;
   an indication of a parameter of an acoustic channel to be used to receive the vocalised prompt; and
      an indication of vocal characteristics of a user whose identity is to be verified;
   a physical transducer configured to present the at least one vocal prompt element to the user, the at least one vocal prompt element to be vocalised by the user for speaker recognition;
   a microphone for receiving a vocalised prompt;
   wherein the vocalised prompt consists of an audio signal corresponding to sounds of the at least one vocal prompt element as vocalised by the user;
   wherein the apparatus further comprises a speaker recognition module configured to analyse an audio signal corresponding to sounds vocalised by the user in response to the presentation of the at least one vocal prompt element to the user for speaker recognition, wherein the speaker recognition module is configured to receive an indication of the selected at least one vocal prompt element and to select at least one user model for an enrolled user based on the selected at least one vocal prompt element, and
   wherein the speaker recognition module is operable in a verification mode to compare said audio signal with the at least one user model for an enrolled user to determine or verify the identity of the user for biometric speaker recognition.

2. The apparatus as claimed in claim 1 wherein the prompt element selector is configured to select the at least one vocal prompt element based on respective discrimination scores for the plurality of vocal prompt elements wherein at least some discrimination scores vary according to the indication of operating conditions for the biometric speaker recognition.

3. The apparatus as claimed in claim 1 wherein said set of a plurality of vocal prompt elements comprises a plurality of predefined subsets of vocal prompt elements and the prompt element selector is configured to select the at least one vocal prompt element from one of the subsets based on the indication of operating conditions.

4. The apparatus as claimed in claim 1 wherein the plurality of vocal prompt elements are associated with metadata indicating speech sounds associated with the at least one vocal prompt element when vocalised and the prompt element selector is configured to select the at least one vocal prompt element based on said metadata and the indication of operating conditions.

5. The apparatus as claimed in claim 1 wherein the prompt element selector is configured to select the at least one vocal prompt element based on an indication of noise in an audio signal derived from a microphone to be used to receive the vocalised prompt.

6. The apparatus as claimed in claim 5 comprising a noise estimator for receiving the audio signal derived from the microphone to be used to receive the vocalised prompt and determining said indication of noise wherein the noise estimator is configured to identify and analyse parts of the audio signal that do not correspond to sounds vocalised by the user to determine said indication of noise.

7. The apparatus as claimed in claim 1 wherein the prompt element selector is configured to select the at least one vocal prompt element based on an indication of microphone resonances.

8. The apparatus as claimed in claim 1 wherein said indication of operating conditions comprises an indication of previous prompts generated as part of a current attempt to verify the identity of the user.

9. The apparatus as claimed in claim 1 wherein the speaker recognition module is operable in an enrolment mode to process said audio signal to form a user model for an enrolling user.

10. The apparatus as claimed in claim 9 wherein the speaker recognition module is configured to receive an indication of the selected at least one vocal prompt element and to form said user model for the enrolling user based on the selected at least one vocal prompt element.

11. The apparatus as claimed in claim 1 comprising a speech recognition module configured to analyse an audio signal corresponding to sound vocalised by the user in response to the prompt to determine whether or not the user did vocalise the selected at least one vocal prompt element.

12. The apparatus as claimed in claim 1 wherein the apparatus is implemented in a host device communicatively coupled to an accessory device.

13. The apparatus as claimed in claim 12 wherein the accessory device comprises a headset or a wearable device.

14. The apparatus as claimed in claim 1 wherein the apparatus is implemented in an accessory device or a wearable device.

15. The apparatus as claimed in claim 14 wherein the accessory device comprises a headset.

16. An electronic device comprising an apparatus as claimed in claim 1 wherein the electronic device is at least one of: a portable device; a communication device; a mobile telephone; a computing device; a laptop, notebook or tablet computer; a gaming device; a wearable device; a voice controllable device; an identity verification device; or a domestic appliance.

17. An apparatus for generating a prompt to be vocalised by a user for biometric speaker recognition comprising:

a prompt element selector for selecting at least one vocal prompt element to form at least part of said prompt from a predetermined set of a plurality of vocal prompt elements;

wherein the prompt element selector is configured to select the at least one vocal prompt element based on an indication of noise in an audio channel used for the biometric speaker recognition;

a physical transducer configured to present the at least one vocal prompt element to the user, the at least one vocal prompt element to be vocalised by the user for speaker recognition;

a microphone for receiving a vocalised prompt, wherein the vocalised prompt consists of an audio signal corresponding to sounds of the at least one vocal prompt element as vocalised by the user;

wherein the apparatus further comprises a speaker recognition module configured to analyse an audio signal corresponding to sounds vocalised by the user in response to the presentation of the at least one vocal prompt element to the user for speaker recognition, wherein the speaker recognition module is configured to receive an indication of the selected at least one vocal prompt element and to select at least one user model for an enrolled user based on the selected at least one vocal prompt element, and wherein the speaker recognition module is operable in a verification mode to compare said audio signal with the at least one user model for an enrolled user to determine or verify the identity of the user for biometric speaker recognition.

18. An apparatus for generating a prompt to be vocalised by a user for biometric speaker recognition comprising:

a prompt element selector for selecting at least one vocal prompt element to form at least part of said prompt from a predetermined set of a plurality of vocal prompt elements;

wherein the prompt element selector is configured to select the at least one vocal prompt element based on an indication of operating conditions of the biometric speaker recognition and a discrimination score for the at least one vocal prompt element indicative of the likelihood of that at least one vocal prompt element to provide discrimination between users for the current operating conditions;

a physical transducer configured to present the at least one vocal prompt element to the user, the at least one vocal prompt element to be vocalised by the user for speaker recognition;

a microphone for receiving a vocalised prompt, wherein the vocalised prompt consists of an audio signal corresponding to sounds of the at least one vocal prompt element as vocalised by the user;

wherein the indication of operating conditions for the biometric speaker recognition comprises one or more of:

an indication of an acoustic environment in which the at least one vocal prompt element will be vocalised;

an indication of reverberation in an audio signal derived from a microphone to be used to receive the vocalised prompt;

an indication of pitch of sounds previously vocalised by the user;

an indication of a parameter of an acoustic channel to be used to receive the vocalised prompt; and an indication of vocal characteristics of a user whose identity is to be verified;

wherein the apparatus further comprises a speaker recognition module configured to analyse an audio signal corresponding to sounds vocalised by the user in response to the presentation of the at least one vocal prompt element to the user for speaker recognition, wherein the speaker recognition module is configured to receive an indication of the selected at least one vocal prompt element and to select at least one user model for an enrolled user based on the selected at least one vocal prompt element, and wherein the speaker recognition module is operable in a verification mode to compare said audio signal with the at least one user model for an enrolled user to determine or verify the identity of the user for biometric speaker recognition.

19. An apparatus for generating a prompt to be vocalised by a user for biometric speaker recognition comprising:

a prompt element selector for selecting at least one vocal prompt element to form at least part of said prompt from a predetermined set of a plurality of vocal prompt elements;

wherein each of said set of vocal prompt elements provides discrimination between different users above a predetermined threshold level;

a physical transducer configured to present the at least one vocal prompt element to the user, the at least one vocal prompt element to be vocalised by the user for speaker recognition;

a microphone for receiving a vocalised prompt, wherein the vocalised prompt consists of an audio signal corresponding to sounds of the at least one vocal prompt element as vocalised by the user;

wherein the apparatus further comprises a speaker recognition module configured to analyse an audio signal corresponding to sounds vocalised by the user in response to the presentation of the at least one vocal prompt element to the user for speaker recognition, wherein the speaker recognition module is configured to receive an indication of the selected at least one prompt element and to select at least one user model for an enrolled user based on the selected at least one vocal prompt element, and wherein the speaker recognition module is operable in a verification mode to compare said audio signal with the at least one user model for an enrolled user to determine or verify the identity of the user for biometric speaker recognition.

\* \* \* \* \*